(No Model.)
H. STEINKE & M. LIMPRECHT.
VAPOR APPARATUS FOR HOT HOUSES, &c.
No. 320,411. Patented June 16, 1885.
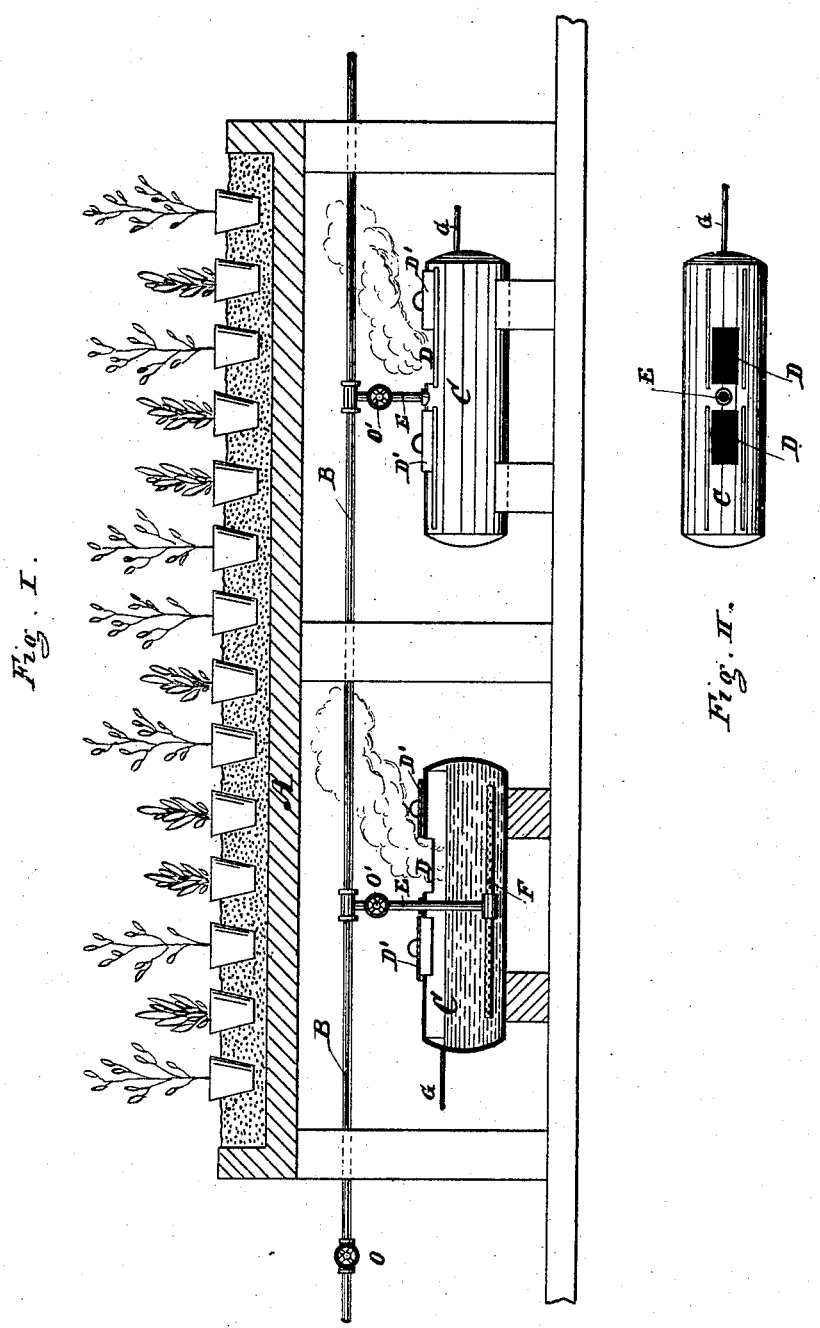
WITNESSES
Wm A Lowe
Robt Roy
INVENTOR
H. Steinke & M. Limprecht
per Roeder & Briesen
Attorneys

UNITED STATES PATENT OFFICE.

HERMANN STEINKE, OF BROOKLYN, NEW YORK, AND MAX LIMPRECHT, OF UNION HILL, NEW JERSEY.

VAPOR APPARATUS FOR HOT-HOUSES, &c.

SPECIFICATION forming part of Letters Patent No. 320,411, dated June 16, 1885.

Application filed April 3, 1885. (No model.)

*To all whom it may concern:*

Be it known that we, HERMANN STEINKE, of the city of Brooklyn, county of Kings, and State of New York, and MAX LIMPRECHT, of Union Hill, Hudson county, and State of New Jersey, have invented a new and Improved Vapor Apparatus for Hot-Houses and Conservatories, of which the following specification is a full, clear, and exact description.

This invention relates to a new apparatus for heating and evaporating water within a greenhouse or hot-house. It consists in the combination of a hot-house having a shelf with an inlet-pipe, branch pipe, tank having a door, and with a cock to admit steam into or exclude it from the branch pipe, all as hereinafter more fully set out.

In the accompanying drawings, Figure I represents a general plan of the arrangement, and Fig. II a top view of one of the tanks.

A represents the usual shelf of a hot-house or conservatory, supporting the flower-pots or the propagating-beds; and B, the steam-pipes for heating the house, arranged in the usual manner. C are tanks, partially filled with water, made tight, with openings D closed by a suitable door, D', capable of being closed tight. E is a branch steam-pipe leading from the main pipes B into the tanks C, below the surface of the water, and which may be provided with a perforated branch pipe, F, at the bottom. Necessary cocks or valves O O', are arranged in the steam-pipes for regulating the steam as may be desired. Whenever it is necessary or desired, the cocks O' in one or more of the branch pipes E are opened, whereby the steam will be admitted into the tanks C, heating and evaporating the water in said tanks, and the vapors thus generated will be allowed to escape through the openings D, distributing themselves all over the hot-house and falling in fine sprays upon the plants and soil until the required moisture is obtained. When not required for the purpose of watering the plants, &c., the doors D' are closed tight, and the tanks C will assist in heating the conservatory, and, being closed perfectly tight, will retain and give out heat for a considerable length of time after the steam-heating pipes have cooled off. These tanks C are placed about ten or twelve feet apart, and are supplied with water through the pipes G.

What we claim as our invention, and desire to secure by Letters Patent, is—

The combination of a hot-house having shelf A, with inlet-pipe B, branch pipe E, tank C, having door D', and with cock to admit or exclude steam from the branch pipe, substantially as herein shown and described, and for the purpose specified.

HERMANN STEINKE.
MAX LIMPRECHT.

Witnesses:

HENRY E. RAEDER,
ROBT. ROY.